(12) United States Patent
Rowe

(10) Patent No.: US 8,096,266 B2
(45) Date of Patent: Jan. 17, 2012

(54) SYSTEMS AND METHODS FOR WATERING ANIMALS

(75) Inventor: Sean Rowe, Reno, NV (US)

(73) Assignee: Veterinary Ventures, Inc., Knoxville, TN (US)

( * ) Notice: Subject to any disclaimer, the term of this patent is extended or adjusted under 35 U.S.C. 154(b) by 491 days.

(21) Appl. No.: 12/255,458

(22) Filed: Oct. 21, 2008

(65) Prior Publication Data

US 2010/0095897 A1  Apr. 22, 2010

(51) Int. Cl.
*A01K 7/00* (2006.01)

(52) U.S. Cl. .......................................... 119/74

(58) Field of Classification Search ................ 119/51.5, 119/58, 72, 73, 74–76, 78; 239/17, 18, 23, 239/24, 28, 29.5
See application file for complete search history.

(56) References Cited

U.S. PATENT DOCUMENTS

| | | | | |
|---|---|---|---|---|
| 2,242,680 A * | 5/1941 | Schacht | | 239/489 |
| 2,474,469 A * | 6/1949 | La Grange | | 119/74 |
| 4,205,785 A * | 6/1980 | Stanley | | 239/17 |
| 5,501,178 A * | 3/1996 | Kemp | | 119/74 |
| 5,695,119 A * | 12/1997 | Lien | | 239/17 |
| 5,749,518 A * | 5/1998 | Wang | | 239/17 |
| 6,055,934 A * | 5/2000 | Burns et al. | | 119/74 |
| 6,257,560 B1 * | 7/2001 | Kim | | 261/36.1 |
| 6,526,916 B1 * | 3/2003 | Perlsweig | | 119/74 |
| 6,622,657 B2 * | 9/2003 | Northrop et al. | | 119/74 |
| 6,848,629 B2 * | 2/2005 | Palmer et al. | | 239/17 |
| 7,270,082 B2 * | 9/2007 | Plante | | 119/74 |
| 7,430,988 B2 * | 10/2008 | Perlsweig et al. | | 119/75 |
| 7,690,585 B1 * | 4/2010 | Johns et al. | | 239/16 |

* cited by examiner

*Primary Examiner* — Richard Price, Jr.
(74) *Attorney, Agent, or Firm* — Pitts, Lake & Bell, P.C.

(57) ABSTRACT

Systems and methods for watering animals generally include a container having an inner recess. A pump directs water from the inner recess of the container through a fluid column, which may contain filter medium. One or more spouts are located at a terminal end of the fluid column and direct the water in one or more streams back to the inner recess of the container. The spouts may be associated with one of various spout plates that can be interchanged with one another and adjusted to orient the streams of water. Some embodiments employ a restrictor plate that may be variably positioned within the flow of water. Other embodiments provide a variable speed pump that incrementally adjusts the rate of flow.

30 Claims, 9 Drawing Sheets

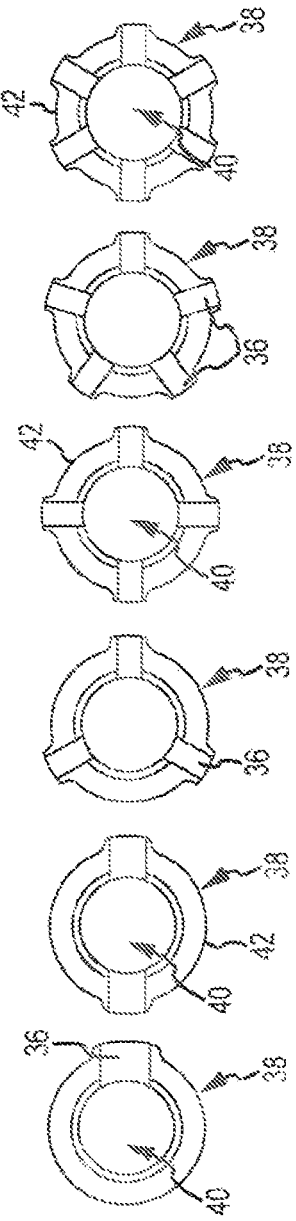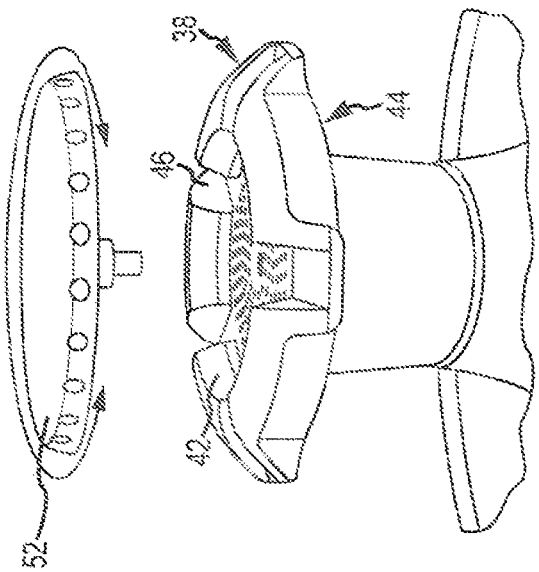

SYSTEMS AND METHODS FOR WATERING ANIMALS

CLAIM OF PRIORITY UNDER 35 U.S.C. §119

None.

CLAIM OF PRIORITY UNDER 35 U.S.C. §120

None.

REFERENCE TO CO-PENDING APPLICATIONS FOR PATENT

None.

BACKGROUND

Household pets have demonstrated a preference for drinking from streams or other moving bodies of water. Dogs, for example, have historically been drawn toward recently flushed toilets and running garden hoses for drinks of water. Cats have proven especially attracted to free falling water and have been frequently observed crouching next to sinks in kitchens or bathrooms, or jumping into bathtubs or showers. However, animals have found such opportunities to be sporadic or infrequent, causing the animals to seek out leaking faucets or other sources of running water inadvertently left on by the animal' owners.

Without sources of moving water, animals have been traditionally left with bowls of standing water that have not held the same level of fascination. More frequently than not, bowls of water have been left to stagnate or otherwise become stale due to the lack of movement. Accordingly, animals have been instinctively drawn to moving, fresh water. Turbulence within the moving water causes aeration by breaking the surface tension of standing water and drawing oxygen into the water from the atmosphere (as evidenced by bubbles in the water). This turbulence and resulting aeration has been most effectively demonstrated by a stream of water falling into a body of water.

Pet owners have routinely complained, however, about the animals' tendency to seek untraditional sources of water. Such habits have proven to be a nuisance and an occasional source of embarrassment when quest have found the family pet drinking from the toilet. Worse at times have been repeated begging by cats for faucets to be turned on. Moreover, when owners have forgotten to turn the faucets off, countless gallons of fresh water have been wasted, increasing water bills. The animals' quest for moving water has also proven unsanitary, where the animals have jump onto kitchen counters near food preparation areas.

Other considerations specific to cats have included the prevalence of Feline Urologic Syndrome (FUS) which has been shown to create urinary tract obstruction by mineral crystals, and of kidney disease which has lead to renal failure. It has been demonstrated that easy access to running water causes some cats to drink more than they normally would from a bowl of standing water. The importance of increased water intake and optimal hydration is to: a) create a more dilute urinary output which minimizes crystal formation and possible obstruction; and b) maintain blood pressure at optimal levels to support the filtering duties of diseased kidneys.

Previous watering devices have been developed that provided animals with moving water. For example, each of U.S. Pat. No. 5,799,609, U.S. Pat. No. 5,822,437, and U.S. Pat. No. 6,055,934 disclosed animal watering devices in the form of a free falling, continuous stream of water. Specifically, each device included a pump that moved water from a reservoir to a discharge ramp, where the water flowed into a container in a unidirectional manner. Some embodiments of the devices permitted a user to adjust the rate at which the water flowed. However, in order to do so, the user had to stop the flow of water and then placing one or more washers within a partially submerged water intake tube. Accordingly, while such systems provided sources of continually flowing water for animals, the limited control over the flow of the water proved to be inconvenient.

The previous watering device designs have commonly provided single streams of water could not be easily oriented with respect to the container. This often left animals with only a single direction from which the animal could approach the watering device to drink. As such, some prior watering devices have not made it easy for more than one animal to simultaneously drink from the watering device. Moreover, the aesthetic value of such devices has been limited due to the positioning of pumps and secondary reservoirs in plain view. Single streams of moving water, while better than still pools, have also provided limited amounts of aeration within the water due to the single, focused location of the stream's impact with the main body of water.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

Embodiments of a system and methods of use are disclosed for providing water to animals. In various embodiments, the system includes a container having a fluid column that supports one or more spouts above an inner recess in the container. Various embodiments may include a pump of various types to direct a flow of water from the container, through the fluid column, and out of the one or more spouts. The spouts may be oriented to direct one or more streams of water into the container. In some embodiments, one or more spouts may extend from the fluid column in different directions.

In a variety of different embodiments of the system, a number of separate streams of flowing water in the system may be conveniently varied. In some embodiments, the system is provided with interchangeable spout plates having one or more spouts per plate that can be interchanged with one another. In at least one embodiment, the spout plates may be adjusted with respect to the container to cause the streams of water to pour from the one or more spouts to particular areas of the container's inner recess. Where spout plates are provided with multiple spouts, the spout plates may be oriented to provide separate streams of water that flow in different directions. In other embodiments, the spouts may be provided in one or more fixed orientations.

In some embodiments, the flow rate of the water can be adjusted using a variable flow pump. The variable flow pump may include a flow control arm, which can be moved in opposite directions to increase or reduce the rate of fluid flow while the system is operating. In other embodiments, a restrictor plate may be selectively positioned in and out of the flow of water to vary its flow rate. Some such embodiments may provide a knob near the top of the fluid column for easily manipulating the restrictor plate.

In different embodiments, a filter medium may be associated with the fluid column to remove particulate and other materials from the water. In some embodiments a filter cartridge is removably positioned within an upper end portion of the fluid column for relatively easy access for maintenance and replacement. The filter medium may be formed from various natural and synthetic materials that inhibit the passage of particulate or waste materials.

In other embodiments, the watering device may include a component cover having an inner chamber defined by a continuous sidewall that extends between an open first end portion and an open second end portion. The first end portion of the component cover may be removably coupled with the bottom wall of the container to provide access to the pump or other components that are protected from interference from animals or other outside forces within the cover. One or more openings may be provided through the sidewall of the component cover to place the inner chamber of the component cover in open fluid communication with the inner recess of the container.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

BRIEF DESCRIPTION OF THE DRAWINGS

FIG. 4A depicts a top plan view of one embodiment of a spout plate that may be used with the system for providing water to animals;

FIG. 4B depicts a top plan view of another embodiment of a spout plate that may be used with the system for providing water to animals;

FIG. 4C depicts a top plan view of a further embodiment for a spout plate that may be used with the system for providing water to animals;

FIG. 4D depicts a top plan view of a another embodiment for a spout plate that may be used with the system for providing water to animals;

FIG. 4E depicts a top plan view of another embodiment for a spout plate that may be used with the system for providing water to animals;

FIG. 4F depicts a top plan view of a further embodiment for a spout plate that may be used with the system for providing water to animals;

FIG. 5 depicts a partially exploded view of an embodiment of the system for providing water to animals;

DETAILED DESCRIPTION

The system presented in this application, and methods of using the same, will now be described with reference to the figures contained herein. While the system will be explained with reference to systems to provide water to animals and the like, one of ordinary skill in the art will recognize that other applications are possible. Moreover, the system of the present application also will be described with reference to particular exemplary embodiments. The word "exemplary" is used herein to mean "serving as an example, instance, or illustration." Any embodiment described herein as "exemplary" is not necessarily to be construed as preferred or advantageous over other embodiments. All embodiments described should be considered exemplary unless specifically identified to the contrary.

Figure 1:
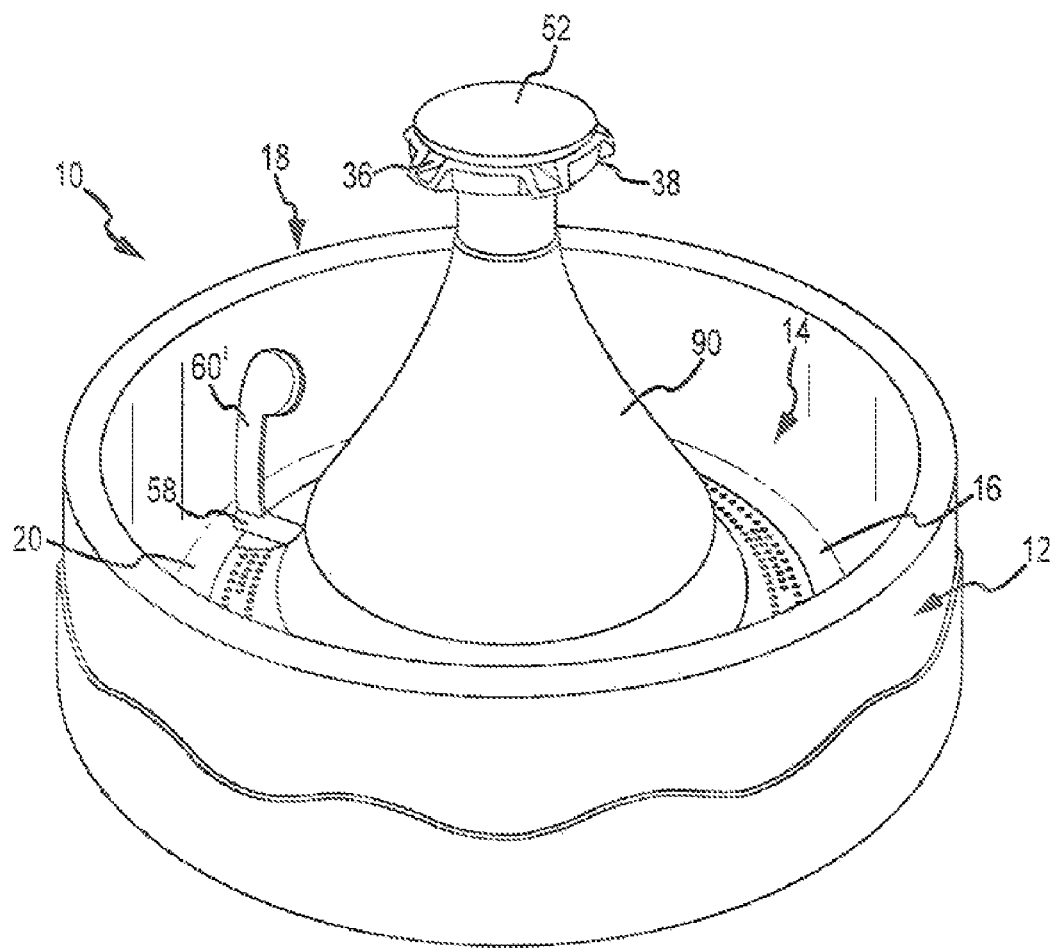
FIG. 1 depicts a perspective view of one embodiment of a system for providing water to animals.
Figure 2:
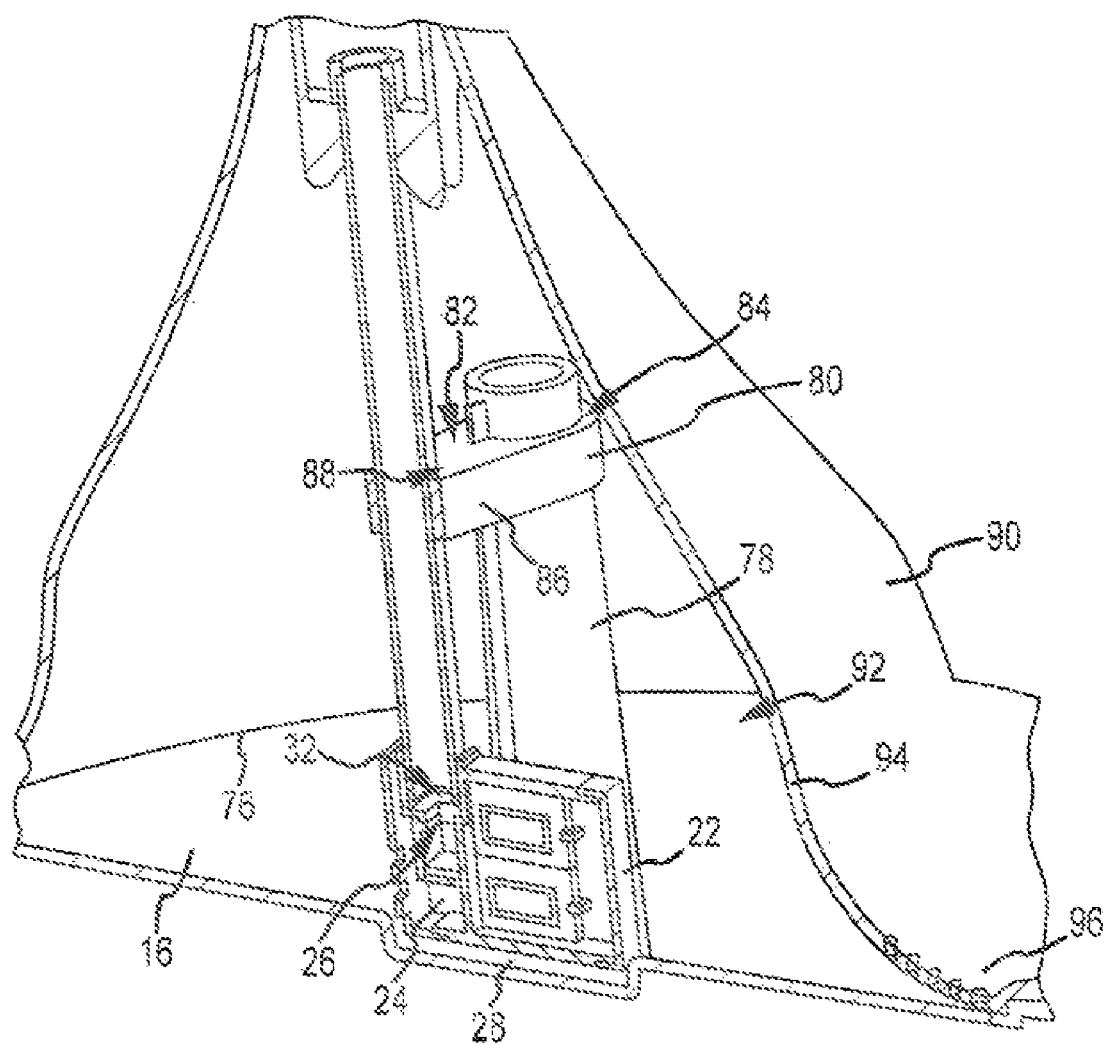
FIG. 2 depicts a partial cut-away view of an embodiment of the system for providing water to animals.

With reference to FIGS. 1 and 2, a system 10 for watering animals may be provided with a container 12, having an inner recess 14 that is at least partially defined by a bottom wall 16, an open upper portion 18 and at least one sidewall 20 that extends between the bottom wall 16 and the open upper end portion 18. While the shape of the bottom wall 16 is depicted in the figures as being circular and generally planar, the shape and orientation of the bottom wall 16 can vary according to various intended uses. In various embodiments, three or more generally straight sidewalls 20 may be provided and define nearly any number of shapes, including square, rectangle, triangle or other desired polygon. However, the system 10 may include one or more curved sidewalls 20 to define common shapes, such as a circle or other fanciful shapes. The side wall 20 may also be provided in various heights so as to define increased or decreased inner recess capacities, as desired. It is further contemplated that the container 12 could be provided with multiple, separate or interconnected, inner recesses 14 at least temporarily holding a supply of water or other fluid. Irrespective of the configuration of the container 12, the open upper portion 18 may be shaped to enable animals to drink from the inner recess 14 of the container 12.

With reference to FIG. 2, various embodiments of the system 10 will include a pump 22 of various designs, such as a low voltage submersible pump with a flow rate of 36 gallons per hour. In some embodiments, the pump 22 is an electrical water pump, having an inlet 24 and outlet 26, whereby water is drawn through the inlet 24 and expelled from the outlet 26 at continuous or variable flow rates. In at least one embodiment, the pump may be centrally located on the bottom wall 16 of the container 12. The bottom wall 16 of the container 12 may be provided with a recess 28 that is shaped to releasably receive a portion of the pump 22. In this manner, the pump 22 may be easily located in a common location and resist movement with respect to the container when the system 10 is operated. In such a location, the inlet 24 may be readily placed in open, fluid communication with the inner recess 14 of the container 12. It is contemplated, however, that the pump 22, may be located externally of the inner recess 14, so long as the inlet 24 is placed in open fluid communication therewith.

Figure 3:
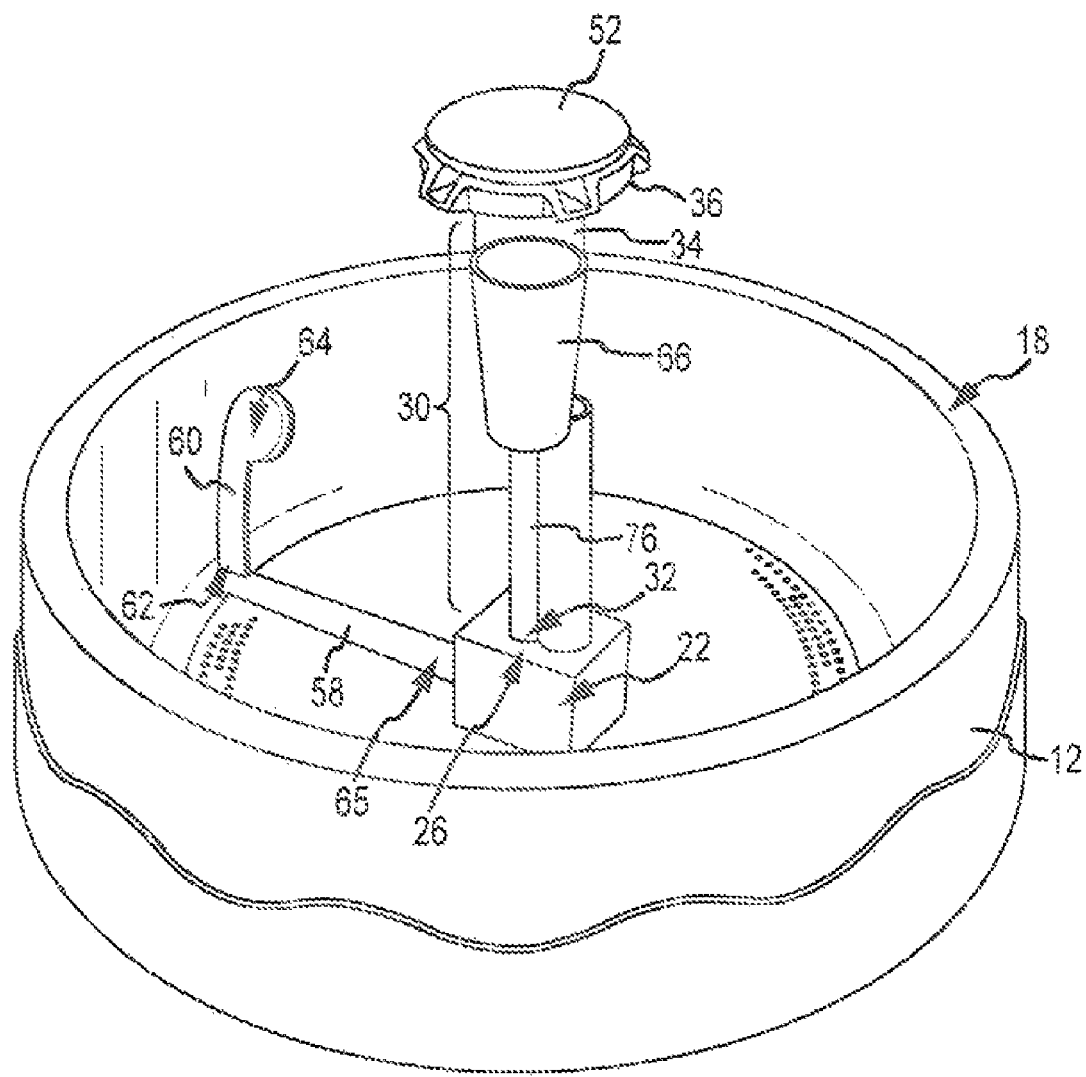
FIG. 3 depicts an embodiment of the system for providing water to animals.

With reference to FIG. 3, embodiments of the system 10 may be provided with an elongated fluid column 30 that extends above the bottom wall 16 of the container 12. The fluid column 30 may have an open fluid pathway that extends between an open first end portion 32 and a second end portion 34. The first end portion 32 may be shaped to be secured with the outlet 26 of the pump to receive the fluid output of the pump 22. In some embodiments, the second end portion 34 of the fluid column 30 is positioned in a vertically spaced relationship above the open upper portion 18 of the container 12. In this manner, water may be directed by the pump 22 from the inner recess 14 of the container 12, through the fluid pathway of the fluid column 30, out the open second end portion 34 and into the inner recess 14 of the container 12.

In various embodiments, one or more spouts 36 can be provided to extend radially from the second end portion 34 of the fluid column 30 define a terminal end of the fluid pathway that extends through the fluid column 30. In such embodiments, water is expelled from the second end portion 34 of the fluid column 30 and through the one or more spouts 36. Accordingly, fluid may be allowed to pass through the one or more spouts 36 in a continuous, free falling manner into the container 12. In one embodiment, the system 10 may have one spout 36 that causes fluid to flow in a single, continuous stream. In another embodiment, the system 10 may have a plurality of spouts 36 that extend radially from the second end portion of the fluid column 30 in different directions. In such embodiments, fluid flows in different directions, in separate, continuous streams. In either such embodiments, it is contemplated that the spouts may be integrally formed with the second end portion 34 of the fluid column 30. The one or more spouts 36 may also be shaped to have a generally round cross-section and expel one or more column-shaped streams of water. Other embodiments may shape the one or more spouts to have generally flat, elongated cross-sections to produce one or more ribbon-shaped streams of water.

In other embodiments, with reference to FIGS. 4A through 4F, the system may be provided with plurality of separate spout plates 38 that are removably interchangeable within the system 10. Each spout plate 38 may have a generally annular shape with an open center portion 40 and a peripheral edge portion 42. Spouts 36 of various sizes and configurations may be formed in the peripheral edge portion 42 so that they are in open fluid communication with the open center portion 40. A bottom end 44 of each spout plate 38, around the open center portion 40, may be shaped to removably engage the second end portion 34 of the fluid column 30. In at least one embodiment, a lower peripheral edge of the bottom end 44 may define a socket that is shaped to releasably receive a portion of the second end portion 34 of the fluid column 30. Accordingly, the spout plates 38 may be secured in position with the second end portion 34 of the fluid column 30 through frictional engagement, or the use of mechanical fastening structures, such as one or more detents, mating threads, fasteners, or the like. Rotation of the spout plate 38 with respect to the fluid column 30 will permit the user to redirect the terminal end or each water stream to a particular area of the inner recess 14 of the container 12.

Figure 6:
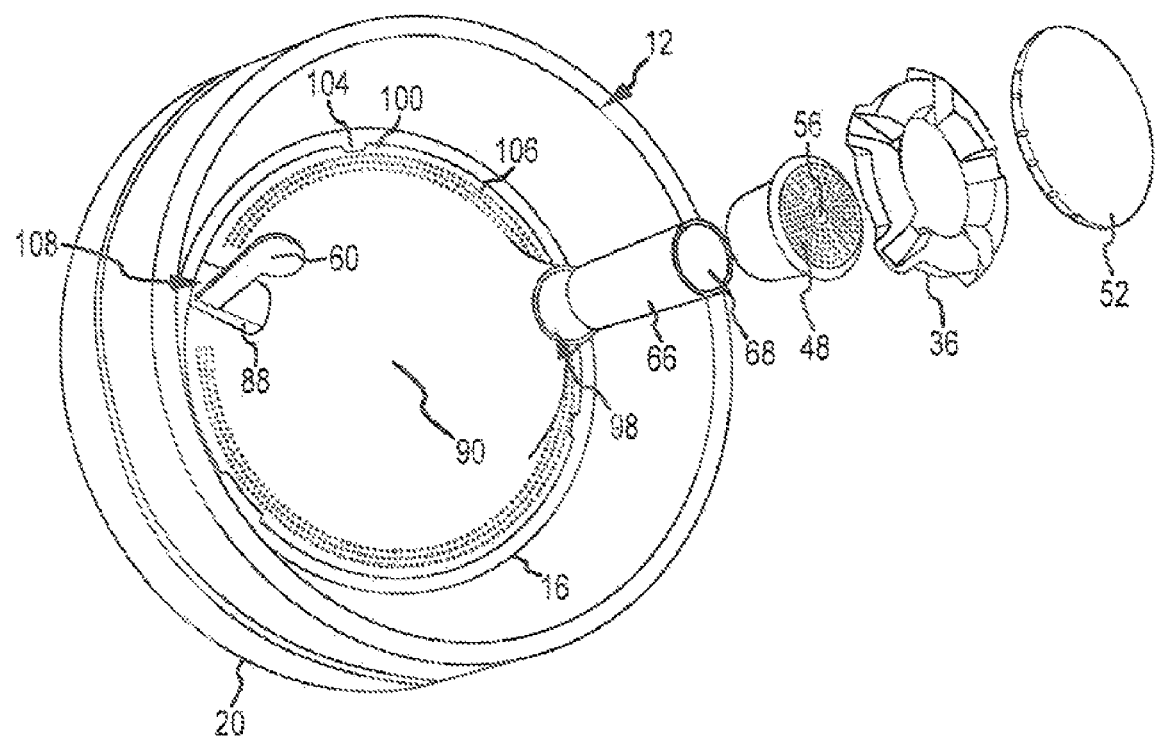
FIG. 6 depicts an exploded view of an embodiment of the system for providing water to animals.

Various embodiments of the fluid column 30 may be provided with an end wall 46 that extends across the second end portion 34 of the fluid column 30. In some embodiments, the end wall 46 may have at least one end wall opening 48 that penetrates the end wall 46. The end wall 46 may have a variety of end wall openings 48 of different shapes and sizes. With reference to FIGS. 5 and 6, a plurality of end wall openings 48 may be oriented with respect to one another to define a strainer that prevents the passage of particulate from within the fluid column 30. Irrespective of the number or shape of the end wall openings 48, fluid flows from the pump outlet 26 through the fluid column 30, and out the second end portion 34.

Figure 7:
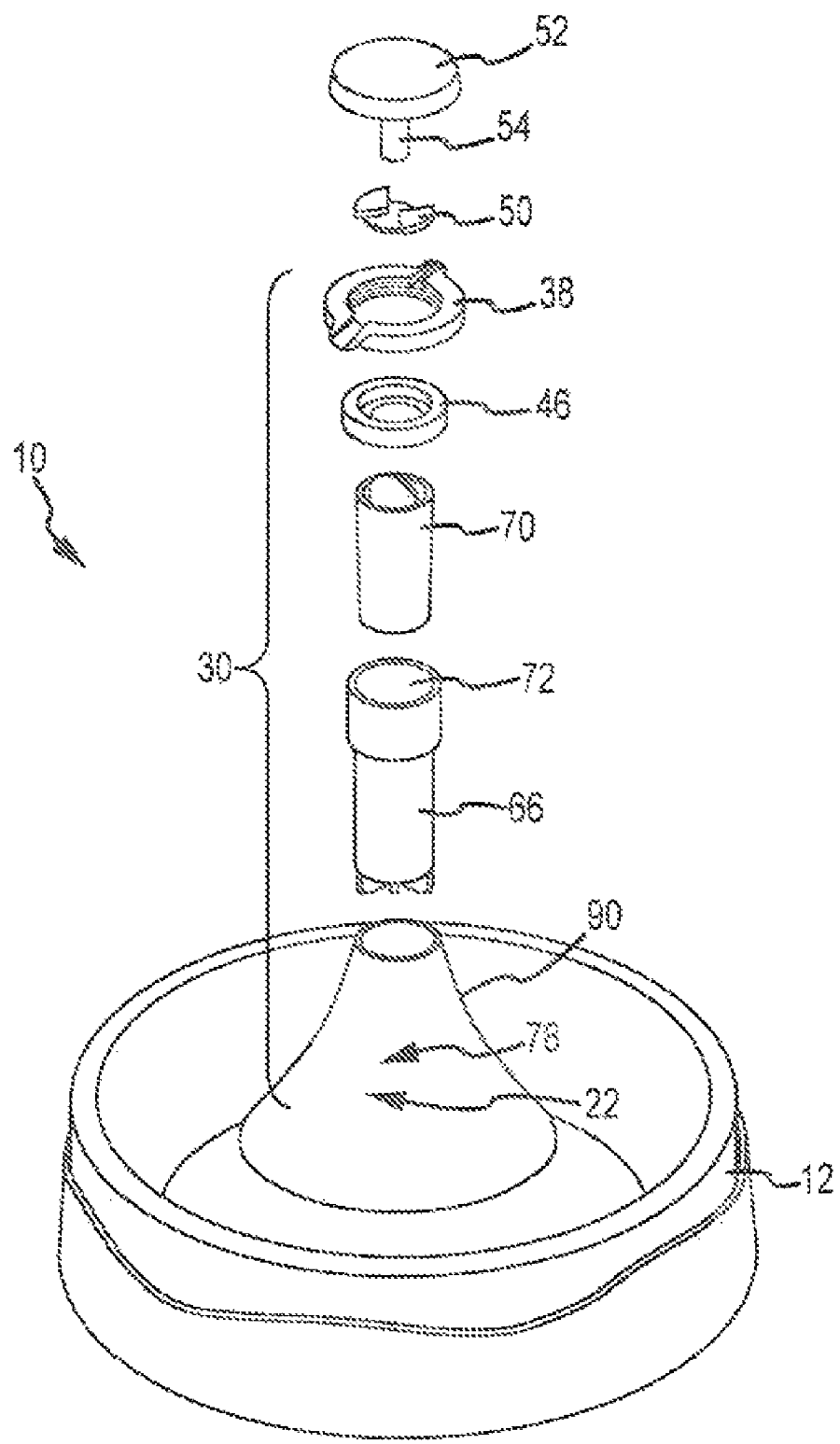
FIG. 7 depicts another exploded view of a embodiment of the system for providing water to animals.
Figure 8:
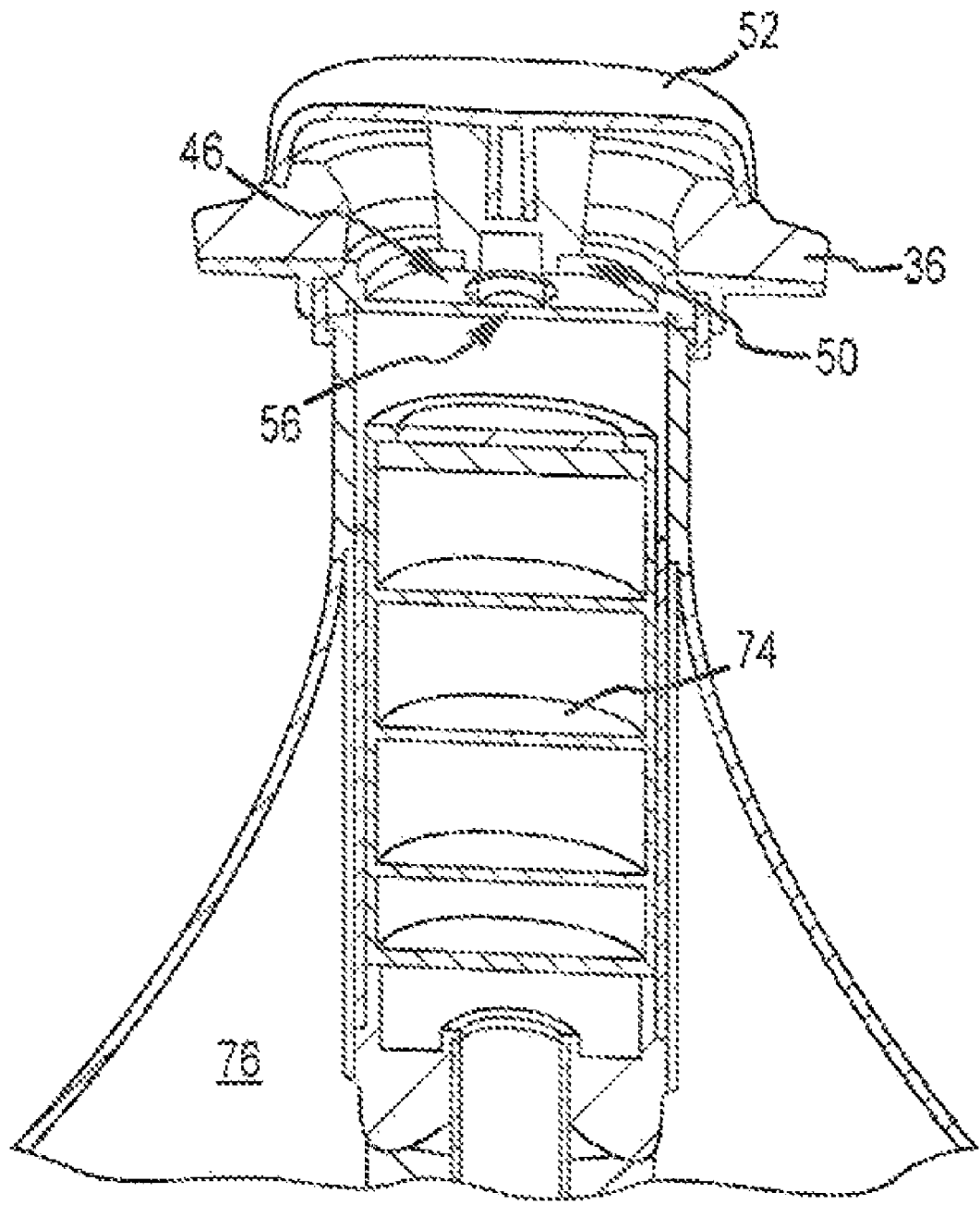
FIG. 8 depicts a partial cut-away view of an embodiment of the system for providing water to animals.

Various embodiments of the system 10 may be provided with one or more controls that enable a user to selectively vary the rate of fluid flow through the system 10 with relative ease. In some embodiments, such controls may be provided to enable rate control while the system 10 is in use. With reference to FIGS. 7 and 8, at least one such embodiment of the system 10 may include a restrictor plate 50 that is removably coupled with the end wall 46 of the fluid column 30 in a manner that permits the restrictor plate 50 to be selectively moved between different positions with respect to at least one end wall opening 48. The restrictor plate 50 may be provided in various shapes and configurations. In some embodiments, the restrictor plate is provided with a generally planar lower surface that is positioned closely adjacent a surface of the end wall 46. In at least one embodiment, the restrictor plate is rotatably coupled with the end wall 46 to permit the restrictor plate 50 to rotate laterally with respect to the one or more end wall openings 48. A post and socket connection between the restrictor plate 50 and end wall 46 may permit the rotatable relative movement between the structures. The different positions of the restrictor plate 50 may place incremental portions of the restrictor plate 50 within a fluid pathway extending through the one or more end wall openings 48.

In some embodiments, a cap 52 may be coupled with the restrictor plate 50. While the cap 52 may provided to have nearly any shape, various embodiments of the cap 52 are generally planar with an annular peripheral edge, which may be knurled for gripping ease. A threaded post 54 may be provided to extend outwardly from a bottom surface of the cap 52 and may be shaped to be disposed within a socket formed in the restrictor plate 50. The restrictor plate 50 can be manually rotatable with respect to the second end portion 34 of the fluid column 30 and the rotation of the cap 52 may be provided to move the restrictor plate 50 between different flow rate positions with respect to the one or more end wall openings 48. In some embodiments, the cap 52 may be coupled with the restrictor plate 50, which, in turn, may engage the end wall 46 in a pivoting manner. In other embodiments the cap 52 may also be used to secure the spout plate 38 in place within the system 10. The threaded post 54 of the cap 52 may be inserted into a reciprocally threaded opening 56 located within the end wall 46 and restrictor plate 50.

As an alternative or in addition to the restrictor plate 50, various embodiments of the system 10 may include an elongated flow control arm 58 that extends outwardly from the pump 22. In at least one embodiment, a lever arm 60 may extend outwardly at an angle from a distal end portion 62 of the flow control arm 58 and a distal end portion 64 of the lever arm 60 may be positioned near or beyond the open upper end portion 18 of the container 12. In some embodiments, the flow control arm 58 may be associated with a variable flow control of the pump 22. Accordingly, the lever arm 60 and flow control arm 58 may be used to dictate the fluid flow rate between the pump inlet 24 and the pump outlet 26 when the lever arm 60 is moved in a first direction and can increase the fluid flow between the pump inlet 24 and the pump outlet 26 when moved in a second direction. In some embodiments, the distal end portion 64 of the lever arm 60 is shaped to be easily gripped by a user and positioned to not reside within a body of water residing within the container. In this manner, the distal end portion 64 of the lever arm 60 may be easily manipulated by the user without getting the user's hand wet.

In at least one embodiment of the system 10, the flow control arm 58 is provide with an open fluid pathway that extends between an opening in the distal end portions 62 and an opening in the proximal end 65 of the flow control arm 58. In some embodiments, the proximal end portion 65 of the flow control arm 58 may be coupled with the pump inlet 24. Accordingly, the open distal end portion 62 of the flow control arm 58 may extend into the inner recess 14 of the container 12 and serve as a remote inlet for the pump 22. It is further contemplated that the openings in the flow control arm 58 could be positioned at one or more positions along a length of the flow control arm 58.

Figure 10:
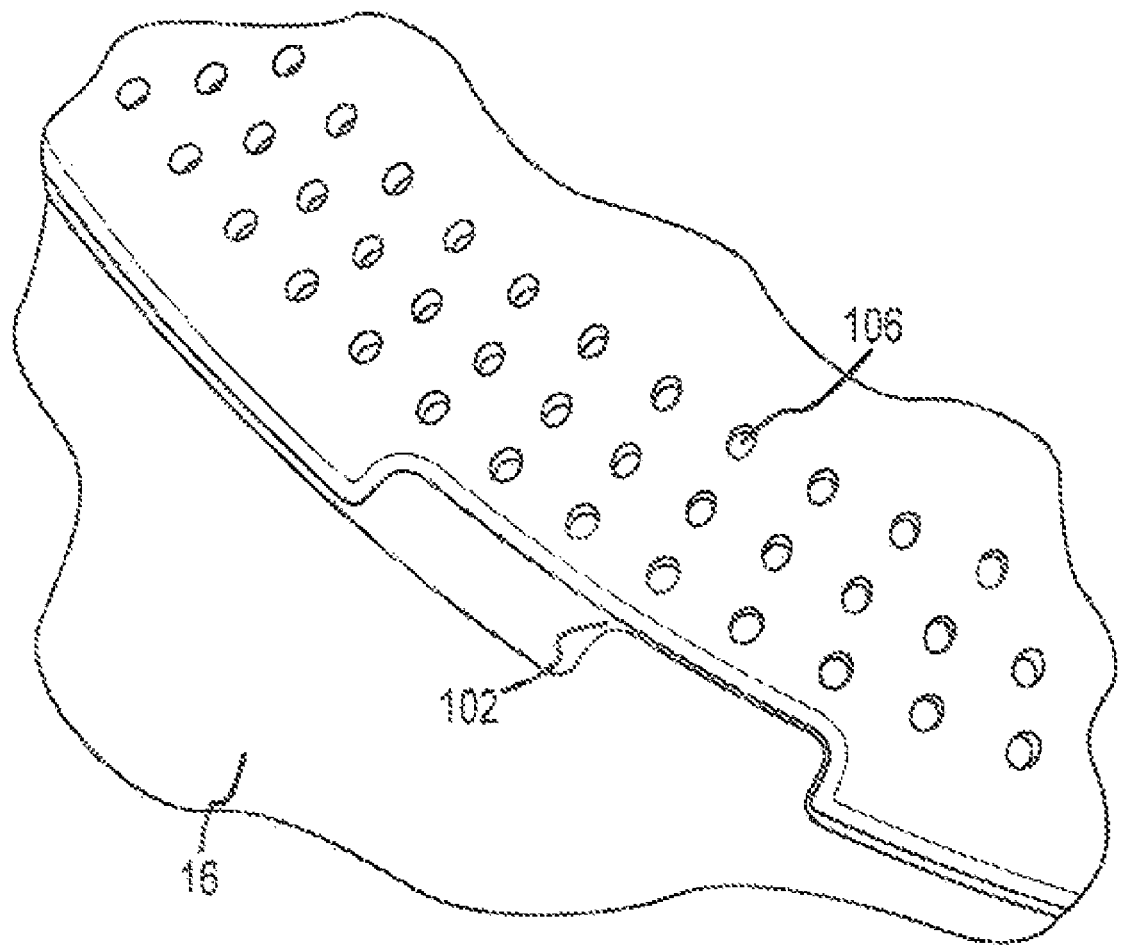
FIG. 10 depicts a partial top plan view of an embodiment of the system for providing water to animals.

With reference to FIGS. 7 and 8, the second end portion 34 of the fluid column 30 may be removably coupled with a central body portion 66 of the fluid column 30. The second end portion 34 and the central body portion 66 of the fluid column 30 may be coupled with one another at a distal opening 68 in the central body portion 66 that is sized to permit the passage of a filter medium 70 through the distal opening 68 and into a filter chamber 72 within the central body portion 66 of the fluid column 30. The filter medium 70 may be provided in various embodiments. The filter medium 70 may include one of various common materials used for filtering fluids. For example, various natural and synthetic materials may form one or more filter element configurations that inhibit the passage of debris and various organic and inorganic waste. With reference to FIG. 10, the filter medium 70 may be provided in the form of a cylindrical cartridge with various compartments 74 wherein fluid, such as water, can pass through. One or more of the compartments 74 may contain the necessary media to inhibit the passage of particulate or waste materials. At least one of the open compartments 74 could further be provided to receive one or more additives that could be used to treat the water for various organic or inorganic compounds within the water. Such additives may also be provided in the form of vitamins or other dietary compounds for animals One or more embodiments may provide the fluid column 30 with a flexible lower section 76 having opposite open ends that place the pump outlet 26 in fluid communication with the central body portion 66 of the fluid column 30. With reference to FIG. 2, the system 10 may be provided with a fluid column support 78 to secure at least a portion of the fluid column 30 in place. In some embodiments, the fluid column support 78 may be integrally formed with the bottom wall of the container 12 while, in other embodiments, a removable connection between the structures is contemplated. In some embodiments, a support arm 80 may be provided to extend radially from the fluid column support 78. A distal end portion 82 of the support arm 98 may be shaped to secure a portion of the fluid column 30. In some embodiments, the distal end portion 82 is shaped to have an open recess into which a potion of the fluid column 30, such as the flexible lower section 76, may reside. In some embodiments, the support arm 80 may be provided with an opening that passes through a proximal end portion 84 of the support arm 80 that is shaped to slidably receive a portion of the fluid column support 78. Frictional tolerances between the two structures may be provided such that the support arm 80 may be selectively positioned at any point along a length of the fluid column support 78 and retain its position for extended periods of time. In at least one embodiment, the fluid column support 78 and support arm 80 may be shaped to engage one another in a manner that resists rotational movement with respect to one another. For example a tongue 86 may be provided to extend radially from a length of the fluid column support 78 while a groove 88 is formed in the support arm 80 and shaped to slidably receive the tongue 86.

Figure 9:
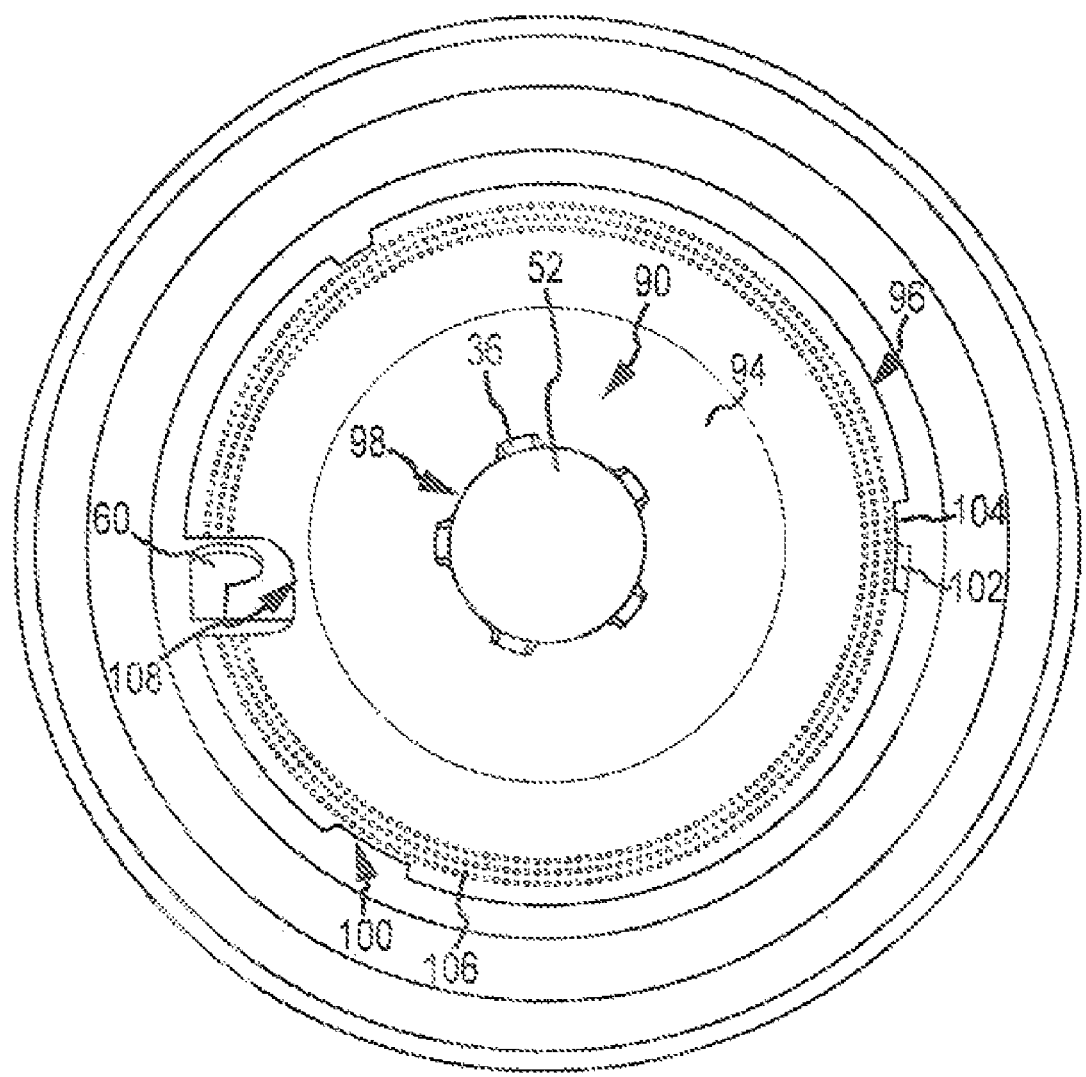
FIG. 9 depicts a top plan view of the system for providing water to animals.

With reference to FIG. 9, various embodiments of the system 10 may include a component cover 90 having an inner chamber 92 defined by a continuous sidewall 94 that extends between an open first end portion 96 and an open second end portion 98. While the component cover 90 is depicted as a frusto conical shape, the component cover 90 may take the form of various other shapes, such as a pyramid, sphere, cube or various combinations thereof. In some embodiments, the inner chamber 92 of the component cover 90 is shaped to house at least the pump 22 and a portion of the fluid column 30. The first end portion 96 of the component cover 90 may be removably coupled with the bottom wall 16 of the container 12. With reference to FIGS. 9 and 10, some embodiments of the cover 90 may have a plurality of elongated notches 100 formed in the peripheral edge of the first end portion 96. One end of the elongated notches 100 may be provided with a recessed receiving tab 102 while the opposite end of the elongated notches 100 may be open. A plurality of locking tabs 104 may be formed in the bottom wall 16 of the container 12 and positioned to be simultaneously passed through the open end portions of the notches 100 when the first end portion 96 of the component cover 90 is placed on the bottom wall 16 of the container 12. In at least one embodiment, the locking tabs 104 will be shaped to cantilever above the bottom wall 16 a sufficient distance to receive the receiving tabs 102 between the bottom wall 16 and the locking tabs 104. Accordingly, the component cover 90 may be rotated between locked and unlocked positions with the bottom wall 16 of the container 12. Other temporary securement structures, such as opposing posts and sockets, mating threads and the like may also be used to removably secure the cover 90 with the bottom wall 16.

With further reference to FIG. 10, there may be one or more openings 106 formed through the sidewall 94 that places the inner chamber 92 of the component cover 90 in open fluid communication with the inner recess of the container 12. A plurality of relatively small openings 106 may be provided in the component cover 90 that permit water to pass between the inner recess of the container 12 and the inner chamber 92 of the component cover 90, while keeping a substantial amount of debris from passing into the inner chamber 92 of the component cover 90. In at least one embodiment, the openings 106 are arranged with respect to one another in a manner resembling a debris screen. In other embodiments, at least one opening 108 may be sized to permit a portion of the flow control arm 58 to pass through the opening 108 into the inner chamber 92 of the component cover 90. In such embodiments, the use of a component cover 90 and flow control arm 58 may be simultaneous.

Although the system 10 has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9992, and so forth).

What is claimed is:

1. A system for providing water to animals, comprising;
a container having an inner recess defined by a bottom wall, an open upper end portion and at least one sidewall that extends between the bottom wall and the open upper end portion;
a pump having an inlet and an outlet; the inlet of the pump being in open fluid communication with the inner recess of the container;
a fluid column having an open fluid pathway that extends between an open first end portion and an second end portion; the first end portion being in open fluid communication with the pump outlet; the second end portion of the fluid column positioned in a vertically spaced relationship above the open end portion of the container;
an end wall extending across the second end portion of the fluid column; the end wall having at least one end wall opening that penetrates the end wall;
a restrictor plate operatively coupled with the end wall and selectively movable between different positions with respect to the at least one end wall opening, whereby at least one of the different positions places at least a portion of the restrictor plate within a fluid pathway extending through the at least one end wall opening; and
at least one spout extending radially from the second end portion of the fluid column; the at least one spout defining a terminal end of the fluid pathway of the fluid column.

2. The system of claim 1 further comprising:
a cap operatively coupled with the restrictor plate and manually rotatable with respect to the second end portion of the fluid column; whereby rotation of the cap moves the restrictor plate between the different positions.

3. The system of claim 1 further comprising:
a filter medium removably disposed within the fluid pathway of the fluid column.

4. The system of claim 3 wherein the second end portion of the fluid column is removably coupled with a main body portion of the fluid column; the second end portion and main body portion of the fluid column removably engaging one another at a distal opening in the main body portion that is sized to permit the passage of the filter medium through the distal opening.

5. The system of claim 1 further comprising:
a component cover having an inner chamber defined by at least one sidewall that extends between an open first end portion and an open second end portion; the first end portion of the cover being operatively coupled with the bottom wall of the container; the pump and at least a portion of the fluid column being disposed within the inner chamber of the component cover; at least one opening being formed through the at least one sidewall that places the inner chamber of the component cover in open fluid communication with the inner recess of the cover.

6. The system of claim 5 wherein the fluid column is centrally located above the bottom wall of the container.

7. The system of claim 6 wherein the second end portion of the component cover supports the fluid column above the pump.

8. The system of claim 1 wherein a plurality of spouts extend radially from the second end portion of the fluid column in different directions.

9. The system of claim 8 wherein the plurality of spouts are associated with and extend radially from a spout plate having an open bottom end portion that is removably securable with the second end portion of the fluid column.

10. The system of claim 9 further comprising a plurality of spout plates, each spout plate having an open bottom end portion that is removably securable with the second end portion of the fluid column; at least two of the plurality of spout plates having a number of spouts that differs from one to the other.

11. A system for providing water to animals, comprising
a container having an inner recess defined by a bottom wall, an open upper end portion and at least one sidewall that extends between the bottom wall and the open upper end portion;
a variable flow pump having an inlet, an outlet and a flow control arm that extends outwardly from the pump; the inlet of the pump being in open fluid communication with the inner recess of the container; the flow control arm reducing fluid flow between the inlet and the outlet when moved in a first direction and increasing fluid flow between the inlet and the outlet when moved in a second direction;
a fluid column having an open fluid pathway that extends between an open first end portion and an second end portion; the first end portion being in open fluid communication with the pump outlet; the second end portion of the fluid column positioned in a vertically spaced relationship above the open end portion of the container; and
at least one spout extending radially from the second end portion of the fluid column; the at least one spout defining a terminal end of the fluid pathway of the fluid column.

12. The system of claim 11 further comprising:
a lever arm that extends outwardly at an angle from a distal end portion of the flow control arm, whereby a distal end portion of the lever arm is positioned adjacent the open end portion of the container.

13. The system of claim 11 wherein the flow control arm has an open fluid pathway extending between open distal and proximal ends of the flow control arm; the open proximal end of the flow control arm being in open fluid communication with the inlet of the pump.

14. The system of claim 11 further comprising:
a filter medium removably disposed within the fluid pathway of the fluid column.

15. The system of claim 14 wherein the second end portion of the fluid column is removably coupled with a main body portion of the fluid column; the second end portion and main body portion of the fluid column removably engaging one another at a distal opening in the main body portion that is sized to permit the passage of the filter medium through the distal opening.

16. The system of claim 11 further comprising:
an end wall extending across the second end portion of the fluid column; the end wall having a plurality of end wall openings that penetrates the end wall.

17. The system of claim 11 further comprising:
a component cover having an inner chamber defined by at least one sidewall that extends between an open first end portion and an open second end portion; the first end portion of the cover being operatively coupled with the bottom wall of the container; the pump and at least a portion of the fluid column being disposed within the inner chamber of the component cover; at least one opening being formed through the at least one sidewall; a distal end portion of the flow control arm extending through the at least one opening in the at least one sidewall.

18. The system of claim 17 wherein the fluid column is centrally located above the bottom wall of the container.

19. The system of claim 18 wherein the second end portion of the component cover supports the fluid column above the pump.

20. The system of claim 11 wherein a plurality of spouts extend radially from the second end portion of the fluid column in different directions.

21. The system of claim 20 wherein the plurality of spouts are associated with and extend radially from a spout plate having an open bottom end portion that is removably securable with the second end portion of the fluid column.

22. The system of claim 21 further comprising a plurality of spout plates, each spout plate having an open bottom end portion that is removably securable with the second end portion of the fluid column; at least two of the plurality of spout plates having a number of spouts that differs from one to the other.

23. A system for providing water to animals, comprising
a container having an inner recess defined by a bottom wall, an open upper end portion and at least one sidewall that extends between the bottom wall and the open upper end portion;
a pump having an inlet and an outlet; the inlet of the pump being in open fluid communication with the inner recess of the container;
a fluid column having an open fluid pathway that extends between an open first end portion and an second end portion; the first end portion being in open fluid communication with the pump outlet; the second end portion of the fluid column positioned in a vertically spaced relationship above the open end portion of the container; and
a plurality of spouts extending radially from the second end portion of the fluid column in different directions; the plurality of spouts defining terminal ends of the fluid pathway of the fluid column.

24. The system of claim 23 further comprising:
a filter medium removably disposed within the fluid pathway of the fluid column.

25. The system of claim 24 wherein the second end portion of the fluid column is removably coupled with a main body portion of the fluid column; the second end portion and main body portion of the fluid column removably engaging one another at a distal opening in the main body portion that is sized to permit the passage of the filter medium through the distal opening.

26. The system of claim 23 further comprising:
a component cover having an inner chamber defined by at least one sidewall that extends between an open first end portion and an open second end portion; the first end portion of the cover being operatively coupled with the bottom wall of the container; the pump and at least a portion of the fluid column being disposed within the inner chamber of the component cover; at least one opening being formed through the at least one sidewall that places the inner chamber of the component cover in open fluid communication with the inner recess of the cover.

27. The system of claim 26 wherein the fluid column is centrally located above the bottom wall of the container.

28. The system of claim 26 wherein the second end portion of the component cover supports the fluid column above the pump.

29. The system of claim 23 wherein the plurality of spouts are associated with and extend radially from a spout plate having an open bottom end portion that is removably securable with the second end portion of the fluid column.

30. The system of claim 29 further comprising a plurality of spout plates, each spout plate having an open bottom end portion that is removably securable with the second end portion of the fluid column; at least two of the plurality of spout plates having a number of spouts that differs from one to the other.

\* \* \* \* \*